Sept. 7, 1948. J. W. ARMBRUSTER 2,448,759
WOVEN SENSING GRIDS FOR PERFORATED RECORDS
Filed Feb. 5, 1944

INVENTOR
John W. Armbruster
BY
W. M. Wilson
ATTORNEY

Patented Sept. 7, 1948

2,448,759

UNITED STATES PATENT OFFICE 2,448,759

WOVEN SENSING GRIDS FOR PERFORATED RECORDS

John W. Armbruster, East Rockaway, N. Y., assignor to International Business Machines Corporation, New York, N. Y., a corporation of New York Application February 5, 1944, Serial No. 521,232

6 Claims. (Cl. 235—61.11)

This application is a continuation-in-part of my Patent 2,353,001, filed December 30, 1937.

This invention relates to an improved form of record for controlling an accounting machine wherein the records may remain undisturbed in a file while being analyzed to control devices for accumulating and printing the data represented thereon. The novel construction of the record as a machine control element is also a feature of this invention, because it is by means of selectively connected conducting lines in, or controlled by, the record that a series of records may be sensed successively, even when filed close together in a compartment or file drawer. Heretofore, in order that accounting information could be gathered from record cards, it was necessary to remove such cards from a file, place them in an accounting machine, feed and sense them one by one, and then return them to the file.

Another object of the invention is the provision of a machine control element in the form of a sheet of insulation material with a network of electric conducting lines therein with ten of said lines representing the ten digits and other of the lines selectively connected thereto to form a readout device.

An object of the invention is the provision of means for sensing a stationary perforated record, said means comprising a pair of grids with wires adapted to be pressed against both sides of the record; the wires on one grid representing digits and the wires on the other grid selectively contacting therewith through the perforations in the record to form an electric readout means representing the number characterized by the locations of the perforations in the record.

An object of the invention is the production of a machine control element of woven material with an interwoven network of conducting threads, certain of said threads acting as a readin means for carrying differentially timed digit representing impulses, and other of said threads selectively woven into contact with various readin threads and in turn acting as a readout means for directing data representing impulses to machine controls.

Another object of the invention is the provision of woven data readout connections on a machine control element, said connections extending to the edges of said element so that, even when a series of such elements are stacked together, the data on a confined element may be sensed by electrically analyzing the terminals of said connections at the edge of the element.

An object of the invention is the provision of sensing devices adapted to cooperate with perforated records formed of thin paper stock. Since the records remain stationary and are supported by the grids, they need not be formed of stiff card stock; instead, thin inexpensive paper may be used.

Other objects of the invention will be pointed out in the following description and claims and illustrated in the accompanying drawings, which disclose, by way of example, the principle of the invention and the best mode, which has been contemplated, of applying that principle.

Figure 3:
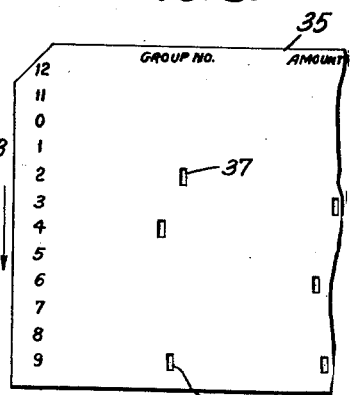
Fig. 3 is a detail view showing a portion of the ordinary perforated record card.

The invention is disclosed in the form of devices associated with tabulating machines, such as those disclosed in the Bryce Patent No. 1,902,013 and Daly Patent No. 1,762,145. Machines of this kind are ordinarily operated by feeding perforated records such as the record 35 (Fig. 3) through the machine in the direction of the arrow. The perforations in the record are sensed as the record moves and the location of the perforation on the record controls the timing of impulses for regulating the various accumulating, printing and group control devices. It is noted in Fig. 3 that a perforation 36 representing the digit 9 is situated near the bottom of the record so that it is sensed early in the operating cycle and is thereby distinguished from a perforation 37 representing the digit 2 which is sensed later in the operating cycle. Thus, it is evident that the functioning of the machine depends upon a movement of the record to control the timing of impulses initiated by the appearance of perforations in the record.

The devices of the present invention differ from the ordinary tabulator control by providing electrical devices for analyzing the records while at rest and providing conducting wires cooperating with the record in such a fashion that differentially timed impulses are directed through connections established at the index points where perforations are sensed.

Figure 1:
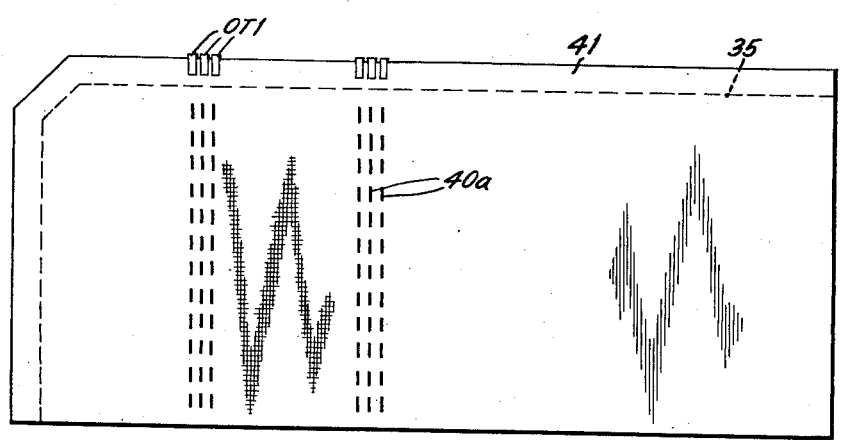
Fig. 1 shows a grid made of wires woven in insulation material.
Figure 1A:
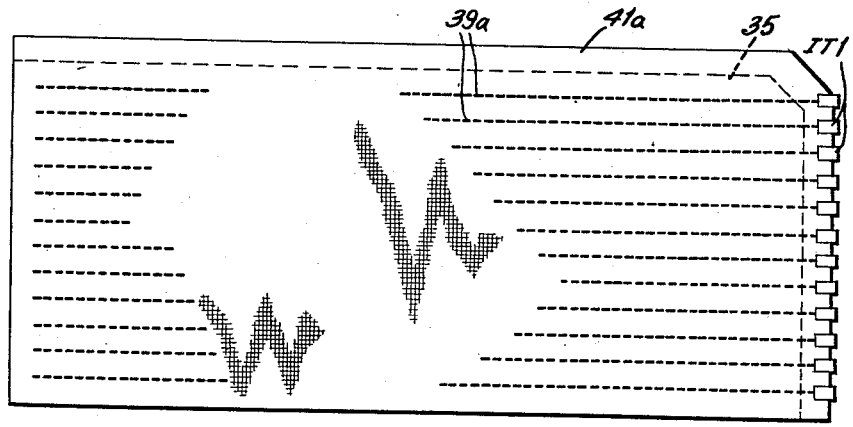
Fig. 1a is a rear view of another woven grid which is a companion to the grid shown in Fig. 1.

According to the present invention, a pair of separate intersecting woven grids, Figs. 1 and 1a, is brought into contact with opposite faces of a stationary perforated record, and extensions on the grids extend through the perforations into contact and form selective paths for the impulses which are timed to be representative of the data perforated in the record. A grid frame carries a set of horizontal lines or wires on one side and a set of vertical lines on the other side. When two such grids are brought together, there is a plurality of intersections, each coinciding with an index point of a tabulating record. The horizontal lines may be formed with eighty warp extensions to project through any perforations found in the usual eighty column card. The vertical lines are formed with twelve woof extensions spaced evenly and coinciding in position with the twelve columnar positions illustrated in Fig. 3. When two grids are placed together, the extensions on vertical lines of one grid coincide with the extensions on the horizontal lines of the other grid, so that contact is established at all line intersection points on the grids. However, when a perforated record is placed between two grids, all line extensions are separated and insulated from each other except those extensions coinciding with a perforation.

The impulses directed through the grids are received at input terminals IT1 (Fig. 1a) and pass through the horizontal lines 39a of one grid, thence through the perforations in the record to the vertical lines 40a (Fig. 1) of another grid and up to output terminals OT1 embedded in the upper edge of the grid frame 41. Each of the twelve horizontal lines 39a is connected to one of the terminals IT1 and insulated from all others by the composition of the frame. In a similar manner, each of the eighty vertical lines 40a is connected to one of the terminals OT1 and insulated from all others.

As explained in Patent No. 2,353,001, of which this is a continuation-in-part, an impulse emitter is provided and driven in synchronism with the tabulator. The control impulses from the emitter are directed through the horizontal lines 39a at differential times. The bottom line 39a receives the first impulse which coincides in time with the usual "9" impulse of the ordinary tabulator cycle. A second impulse is directed into the horizontal line 39a second from the bottom, and the other impulses follow in order up the grid frame. Should one of the vertical wires 40a in one grid frame protrude through a "9" perforation 36 (Fig. 3) in contact with the lowest horizontal wire 39a in another grid frame, it is apparent that the "9" impulse will be received and transmitted through the upper terminal OT1. In a similar fashion any other differentially timed impulse will be carried along a related horizontal line, picked out by the contacting vertical line and carried up to the output terminal OT1, at which point it passes through a contacting connection and is carried into the tabulator.

The terminals IT1 and OT1 are metallic clips which are clamped over the ends of the conducting wires and on the edge of the grid element. A good electrical connection is thus established and made available outside the confines of the record and grid elements when they are stacked.

Figure 1B:
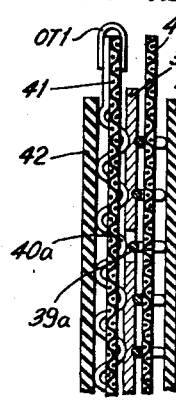
Fig. 1b is a detail view in section showing the pair of grids, such as those shown in Figs. 1 and 1a, associated with a perforated record.
Figure 2:
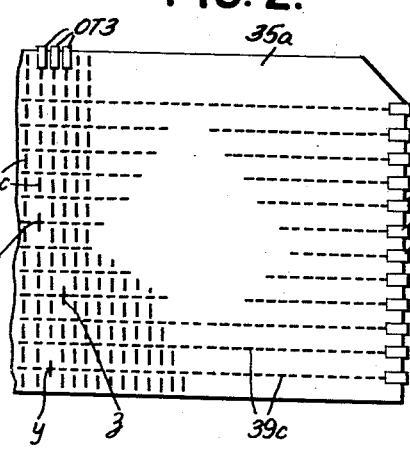
Fig. 2 shows a portion of a record element provided with grid conducting lines woven into contact at certain points to represent fixed data.

It is understood that, when operating with the previously described woven grid constructions, pressure is applied on the faces of the stack to insure contact between warp and woof line projections coinciding with perforations in the records. When such grids and record constructions are of thin flexible material such as rubber, asphalt or other plastic vegetable or mineral material, the application of pressure will form the grids, wires and record into an interlaced unit, as a wire supporting structure. It is possible for a grid, such as grid 41 (Fig. 1), to bear horizontal as well as vertical wires and thus eliminate the need for spacers 42 shown assembled in Fig. 1b. For such construction, Figs. 1 and 1a may be considered different views of the same grid and, of course, the wires at right angle are woven to miss each other at all intersections, just as in Fig. 2 they miss at most intersections. The usual arrangement of weave of Fig. 2 is one wherein all intersecting lines are separated and contact is made between two composite grids through perforations in a record. In other words, the composite grid is like the grid of Fig. 2 without predetermined contact points.

Fig. 2 shows a form of machine control element devised to take the place of the perforated record 35 (Fig. 3) and to operate in the manner described with relation to the grids without requiring the provision of separate grids, the record itself containing the conducting wires or lines forming the grid connections. The body 35a of this element may be made of woven cotton or glass threads, or it may be composed of other insulation materials such as paper or "Bakelite" which are perforated at intervals to simulate woven material. Through this element a series of twelve horizontal conducting lines 39c are threaded or deposited in such a fashion that they appear at intervals, first on one side of the record and then on the other side. Such threading can be done by hand either after weaving the body of the element or along with such weaving. For more rapid operation, selective pattern weaving is performed automatically in Jacquard looms. Other lines 40c are woven in a vertical direction in such a manner that at most of the points of intersection of the horizontal lines therewith the two different lines are separated by the material 35a. However, contact is established at certain select points of intersection X, Y and Z in order that the contacting conducting lines may form a readout means for emitting a plurality of differentially timed impulses.

On the element shown in Fig. 2 it is noted that the weaving of the lines differs from the usual arrangement in three places, at points X, Y and Z. At these points the horizontal lines come into contact with the vertical lines which are there woven out on the same side of the material 35a as the horizontal lines and directly in contact therewith, the result being that when a regular series of timed impulses are received at the terminals IT3 attached to the end of the horizontal lines 39c, three of such impulses are selected to be emitted through the upper terminals OT3. The intersection X is made at a point in the "3" impulse horizontal receiving line and connected to the highest order vertical emitting line. The other two points of connection Y and Z are arranged to read out "9" and "6" impulses, respectively. Therefore, the record element shown in Fig. 2 is constructed with a series of intersecting lines or wires, said lines contacting to represent the number 396.

When records such as that shown in Fig. 2 are stacked together in the file, they will be separated by spacers such as pieces of paper or "Bakelite" in order that the conducting lines of the adjacent records may be prevented from establishing contact.

In the insulation structures of the described control elements and grids, the perforated record card may be regarded as an insulation sheet because it serves to separate the conductors or wire elements and bring them into contact electrically. When referring to sheets of insulation or insulation sheeting, it is understood that reference is made to a layer or layers of any flat or woven insulation material which may or may not include a perforated record as a part of the conducting line supporting insulation structure.

As explained hereinbefore, an impulse emitter is provided and driven in synchronism with the operation of the tabulating machine. The control impulses from the emitter are directed through the horizontal lines 39c at different times. The bottom line 39c receives the first impulse which coincides in time with the usual "9" impulse of the ordinary tabulator cycle and then the other wires are successively energized. Wherever one of the vertical lines 40c protrudes through into contact with the lowest horizontal wire 39c, it is apparent that the "9" impulse will be received and transmitted through to the upper terminals OT3. In a similar fashion any other differentially timed impulse will be carried along a related horizontal line, picked out by the contacting vertical line and carried up to the output terminal OT3, at which point it passes through a contacting connection and is carried into the adding or printing control devices of the tabulator.

When the tabulator is connected for control by the grid analyzers of the present invention, the usual upper and lower brushes are not used and the plug wiring therefrom may be removed from the sockets connected to the adding, printing and group control magnets. The card feeding unit is not used, but it may be allowed to operate without placing any records in the magazine. The usual upper and lower card lever contacts ordinarily close when cards are fed through the regular sensing unit, but in the present instance they may be shunted by closing switches to provide shunt circuits around the contacts.

The impulse emitter already mentioned is provided for initiating in each cycle a set of twelve differentially timed impulses corresponding with the impulses usually sensed when reading the perforations of a moving record card. This emitter is connected to be driven by the mechanism in the tabulator. Although the grid assemblies remain stationary in a file, they are analyzed singly as though in motion by the successive timing of the impulses. The different records in the grids are sensed in succession by movement of a contacting structure placed in the file and provided with an escapement mechanism for controlling movement of the contactors over the grid terminals so that one record after another is brought into association with the sensing control.

In addition to the previously mentioned copending parent Patent 2,353,001, claiming devices for sensing and reading out data representing impulses from a file of grid line elements, there are three copending patent applications related to this case. Patent 2,353,003 contains claims for record sensing elements having conducting lines or wires deposited thereon. Application Serial No. 781,576, filed on October 23, 1947, asserts claims for record sensing elements, each of the grid elements bearing both sets of woven vertical and horizontal grid lines. Application Serial No. 781,577, filed on October 23, 1947, contains claims for a circuit bearing element wherein intersecting grid lines are woven into contact at certain intersections.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:

1. As an article of manufacture, a thin rectangular sheet of insulation material, said sheet having woven therein a plurality of regularly spaced conducting wires, said wires having regularly spaced exposed woof portions along the length of the wires, whereby said sheet, when assembled compactly with another wire bearing sheet with the wires of the last mentioned sheet being exposed and arranged to intersect with the first mentioned wires and with a perforated record between them, provides differential conduction paths by contact of said exposed woof portions through the record perforations and against the wires of said another sheet for conduction of electrical impulses therethrough.

2. A circuit connecting device comprising a pair of parallel sheets, one bearing a set of spaced woven conducting lines aligned in one direction and the other bearing a separate set of spaced woven conducting lines arranged at an intersecting angle with the first mentioned set, said sheets also having a plurality of common index point positions at the intersections of said lines, said lines being formed with coinciding and facing warp and woof projections at all line intersections and said index point positions, whereby a record perforated to represent data can be placed between said sheets to secure contact between certain warp and woof projections of intersecting lines at certain of said points coinciding with said perforations to conductively connect selected intersecting lines for a data reading from a thin pack of two sheets assembled with a perforated record.

3. A machine control device comprising two sheets of material, one with horizontally woven wires extending at regular warp intervals, and another with vertically woven wires extending at regular woof intervals and in positions coincident with the warp extensions of said horizontal wires and adapted for contact therewith, whereby association is made possible with a perforated record having differentially spaced data representing perforations, said record being situated between said two sheets for insulating all extending parts of the wires except those coincident with the perforations.

4. A circuit connecting device comprising a pair of sheets of insulation material, a plurality of regularly spaced conducting lines woven in and out in a horizontal direction along the material of one of said sheets, a plurality of regularly spaced conducting lines woven in and out along a vertical direction in another adjacent one of said sheets, said lines of adjacent sheets extending at intervals, whereby contact is selectively made between lines through a perforated record interposed between said sheets to provide contact paths for electrical control impulses.

5. A device as defined in claim 4 wherein said lines extend to the edge of said sheets whereby said device can be stacked with other devices to constitute a file and have the lines exposed on a face of the file for electrical contact.

6. A circuit connecting device comprising three adjacent insulation sheets and two sets of regularly spaced conducting lines, each set woven through a different one of said sheets and supported thereby at an angle different from that of the other set, to intersect and there be separated by the third of said sheets except where said third sheet is perforated at certain predetermined line intersections, whereby the lines are brought into contact through said perforations to establish circuit paths.

JOHN W. ARMBRUSTER.

REFERENCES CITED

The following references are of record in the file of this patent:

UNITED STATES PATENTS

| Number | Name | Date |
| --- | --- | --- |
| 1,981,987 | Bryce | Nov. 27, 1934 |
| 2,014,432 | Gerhold | Sept. 17, 1935 |
| 2,353,001 | Armbruster | July 4, 1944 |
| 2,353,003 | Armbruster | July 4, 1944 |
| 2,353,061 | Oldenboom | July 4, 1944 |